(12) United States Patent
Burns

(10) Patent No.: US 6,356,673 B1
(45) Date of Patent: Mar. 12, 2002

(54) LOW LOSS COPLANAR WAVEGUIDE HORN FOR LOW DRIVE LINBO₃ MODULATORS

(75) Inventor: William K. Burns, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/566,238

(22) Filed: May 5, 2000

(51) Int. Cl.⁷ .............................................. G02B 1/035
(52) U.S. Cl. ..................... 385/2; 385/1; 385/3; 385/27; 385/28; 385/40; 385/130
(58) Field of Search ............................... 385/1, 2, 3, 8, 385/9, 27, 28, 40, 41, 129, 130, 131, 132

(56) References Cited

U.S. PATENT DOCUMENTS

| | | | |
|---|---|---|---|
| 5,416,859 A | 5/1995 | Burns et al. ................... 385/3 |
| 5,422,966 A | 6/1995 | Gopalakrishnon et al. ...... 385/2 |
| 5,455,876 A | * 10/1995 | Hopfer et al. .................. 385/1 |
| 5,502,780 A | * 3/1996 | Madabhushi ................... 385/3 |
| 5,526,448 A | * 6/1996 | Nagata et al. .................. 385/1 |
| 5,563,965 A | * 10/1996 | Madabhushi .................. 385/2 |
| 5,644,664 A | * 7/1997 | Burns et al. .................... 385/2 |
| 5,787,211 A | * 7/1998 | Gopalakrishnan ............. 385/2 |
| 5,886,807 A | 3/1999 | Burns et al. ................. 359/263 |
| 6,016,198 A | 1/2000 | Burns et al. ................. 356/345 |
| 6,052,496 A | * 4/2000 | O'Donnell ..................... 385/3 |
| 6,236,772 B1 | * 5/2001 | Tavlykaev et al. ............. 385/2 |

OTHER PUBLICATIONS

Rutledge et al.; Infrared and Millimeter Waves, vol. 10, Millimeter components and Techniques, part II, K. J. Burton, Ed., Academic Press. Inc., New York, pp. 1–90, 1983.

Gopalakrishnan et al., Electrical Loss Mechanism in Traveling LiNBO₃ Optical Modulators, Electron Lett., vol, 28, No. 2, pp. 207–288, 1992.

Tsuji et al., New Interesting Leakage Behavior on Coplanar Waveguides of Finite and Infinite Widths, vol. 29, No. 12, pp. 2130–2137, Dec. 1991.

Noguchi et al., A BroadBand and T.: LiNBO₃ Optical Modulator with a Ridge Stucture, J. Lightwave Tech, vol. 13, No. 6, pp. 1164–1168, Jun. 1995.

Burns et al.; BroadBand Reflection Traveling Wave LiNBO₃ Modulator; IEEE Photonics Tech Lett; vol. 10, No. 6.; pp. 805–806; Jun. 1998.

* cited by examiner

Primary Examiner—Brian Healy

(57) ABSTRACT

A low loss coplanar waveguide horn with low drive voltage LiNbO₃ modulators wherein the electrical transmission of the traveling wave electrode structure, and of the input and output coupling structures, sometimes called the "horn", which transition the active electrode structure with microwave connectors, is maximized by an appropriate design of the horn structure. The conflicting requirements of the leaky mode loss and maintaining sufficient size to allow microwave connection, can be reconciled by an adjustment of the ground plane width, which also effects the magnitude of coupling of the guided mode to substrate modes. Control of both the maximum horn size and the width of the ground planes in particular modulator electrode structures can provide operation to 40 GHz in LiNbO₃ devices with substrate thicknesses of ~≦1.0 mm, without excess leaky mode loss. The horn structures are ≦3 mm long and the active waveguides are ~4–5 cm long. They are made on Z-cut LiNbO₃, with electroplated gold CPW electrodes of 10–30 μm thickness.

23 Claims, 5 Drawing Sheets

Cross-section II-II

LOW LOSS COPLANAR WAVEGUIDE HORN FOR LOW DRIVE LINBO₃ MODULATORS

BACKGROUND OF THE INVENTION

1. Field of the Invention

This invention generally pertains to traveling wave LiNbO$_3$ intensity modulators and more specifically to a device in which the reduction of electrode loss due to leaky mode coupling is achieved in a traveling wave LiNbO$_3$ intensity modulator, without a reduced substrate thickness.

2. Description of the Related Art

Traveling wave LiNbO$_3$ intensity modulators are of great interest for analog radio frequency (RF), microwave link and digital and analog optical communication applications. Of particular interest is the drive voltage of the modulator as this quantity determines link gain, sensor sensitivity, and drive power requirements for high-speed (40 Gbits) digital links. In velocity matched, traveling wave devices drive voltage is determined by, first, the low frequency voltage-length product, secondly, by velocity and impedance match, and lastly, by electrical losses in the traveling wave electrode structure.

In general these devices are Mach-Zehnder interferometers operated with a push-pull electrode structure, so that fields of opposite polarity operate on each arm of the waveguide. These fields serve to change the index of the electro-optic LiNbO$_3$, which in turn alters the phase of the light traveling in each waveguide, and thus allows operation of the interferometer.

For Z-cut LiNbO$_3$ devices, the electrode structure is typically coplanar waveguide (CPW). CPW is known to be an intrinsically leaky structure in general, and in optical modulator devices. SEE, Rutledge et al., INFRARED AND MILLIMETER WAVES, Vol.10, MILLIMETER COMPONENTS AND TECHNIQUES, Part II, K. J. Burton, Ed., Academic Press, Inc., New York, 1983; and Gopalakrishnan et al., ELECTRICAL LOSS MECHANISMS IN TRAVELING WAVE LiNbO$_3$ OPTICAL MODULATORS, Electron. Lett., Vol. 28, No. 2, pp. 207–208, 1992 Coupling can occur both between the guided mode and radiation modes in the substrate, and between the guided mode and slab, or substrate, modes in the substrate. Once power is coupled out of the guided mode, it is lost and cannot contribute to optical modulation, thus resulting in an increase in measured drive voltage.

One approach used previously to control coupling of the guided mode to substrate modes was to employ very thin substrates, ~0.25 mm or less. SEE, U.S. Pat. No. 5,416,859, Burns et al., issued May 16, 1995. This has the effect of changing the mode dispersion of the slab, so that the undesirable mode coupling only occurred at higher frequencies, out of the range of interest. This approach was effective, but thin substrates were very fragile and hard to work with, resulting in a low yield of surviving devices. This is particularly so as device length increased to reduce drive voltage.

These leaky mode effects increase with frequency, as the calculated loss coefficient for the guided mode is proportional to the cube of the frequency, $f^3$, for coupling to radiation modes, and to the square of the frequency, $f^2$, for coupling to substrate modes. In both cases, the loss coefficient is proportional to the square of the overall waveguide width, $W_{tot_H} = S_H + 2W_H$, as defined in FIG. 1b. This implies that the widest part of the waveguide horn is responsible for the largest part of the leaky mode loss, and that this extra propagation loss can be minimized by keeping the horn structure small. However, for packaged devices the end of the horns must be sufficiently large that they can be contacted to a microwave connector either directly or with wire bonding or some other connection method.

SUMMARY OF THE INVENTION

An object of this invention is to control leaky mode loss without having a thin substrate.

Another object of this invention is to make a device having a large enough horn size that connection can be made to a electronic transmission cable either directly or with wire bonds.

Another object of this invention is to make a device that will operate to 40 GHz and beyond.

These and other objectives are accomplished by a low loss coplanar waveguide horn with low drive voltage LiNbO$_3$ modulators wherein the electrical transmission of the traveling wave electrode structure, and of the input and output coupling structures, sometimes called the "horns", which transition the active electrode structure with microwave connectors, is maximized by an appropriate design of the horn structure. The conflicting requirements of the leaky mode loss and maintaining sufficient horn size to allow microwave connection, can be reconciled by an adjustment of the ground plane width, which also effects the magnitude of coupling of the guided mode to substrate and radiation modes. Control of both the maximum horn size and the width of the ground planes in particular modulator electrode structures can provide operation to 40 GHz in LiNbO$_3$ devices with substrate thicknesses of ~$\leq 1.0$ mm, without excess leaky mode loss. The horn structures are $\leq 3$ mm long and the active waveguides are ~4–5 cm long. They are made of Z-cut LiNbO$_3$, with electroplated gold CPW electrodes of 10–30 µm thickness.

DETAILED DESCRIPTION OF THE PREFERRED EMBODIMENT

Figure 1A:
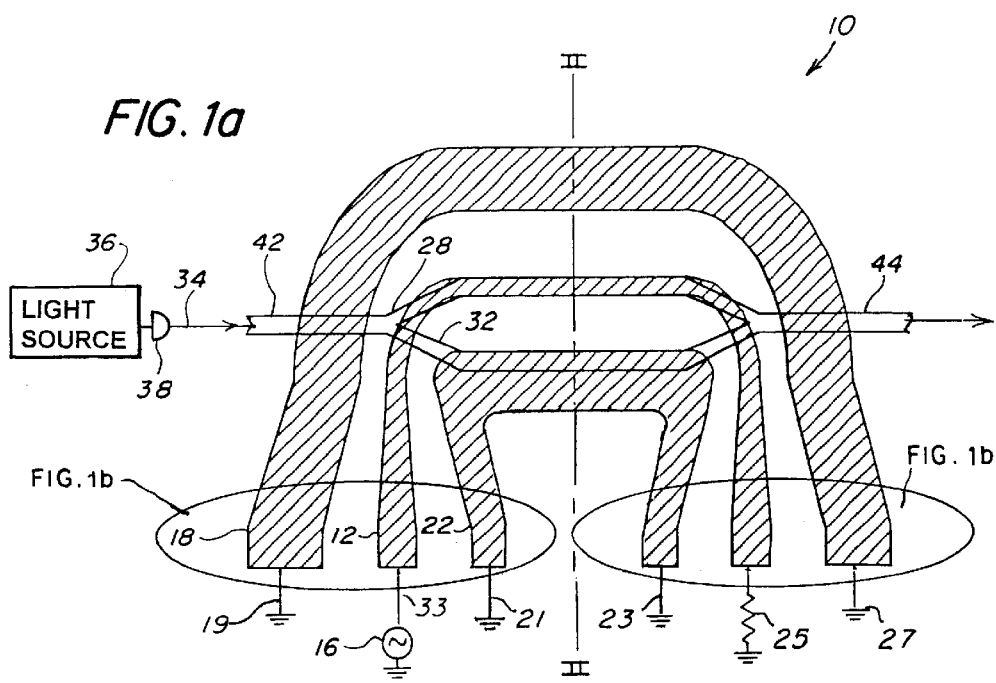
FIG. 1a shows a coplanar waveguide (CPW) electrode structure and Mach-Zehnder interferometer with a low loss coplanar waveguide horn for low drive voltage LiNbO$_3$ modulators.

In the preferred embodiment of this invention 10, as shown in FIG. 1a, is the traveling wave electrode structure, and the input and output coupling structures 12, 18, and 22, which transition the active electrode structure with microwave connectors (not shown) so as to minimize the leaky mode loss while maintaining a usable size of the horns 12, 18, and 22. The conflicting requirements of the leaky mode loss and maintaining a minimum size of the horn 12, 18, and 22, stated above, can be reconciled by an adjustment of the ground plane 18 and 22 width, $W_{g_H}$, which also effects the magnitude of coupling to substrate and radiation modes. SEE, Tsuji et al., NEW INTERESTING LEAKAGE BEHAVIOR ON COPLANAR WAVEGUIDES OF FINITE AND INFINITE WIDTHS, IEEE Trans. MTT, Vol. 39, No. 12, pp. 2130–2137, December 1991. It has been shown below that control of both the maximum horn 12, 18, and 22 size and the width, $Wg_H$, as shown in FIG. 1b, of the ground planes 18 and 22 in particular modulator electrode structures can provide operation to 40 GHz in LiNbO$_3$ devices without excess leaky mode loss and without excessive thinning of the substrate below 0.5 mm.

Figure 1B:
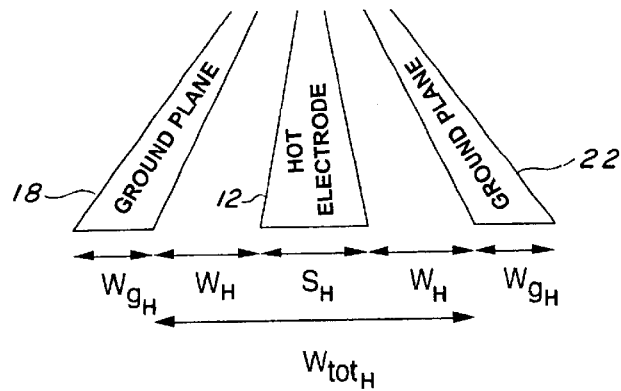
FIG. 1b shows the horn symbols for the CPW electrode structure and Mach-Zehnder interferometer With a low loss coplanar waveguide horn for low drive voltage LiNbO$_3$ modulators.
Figure 1C:
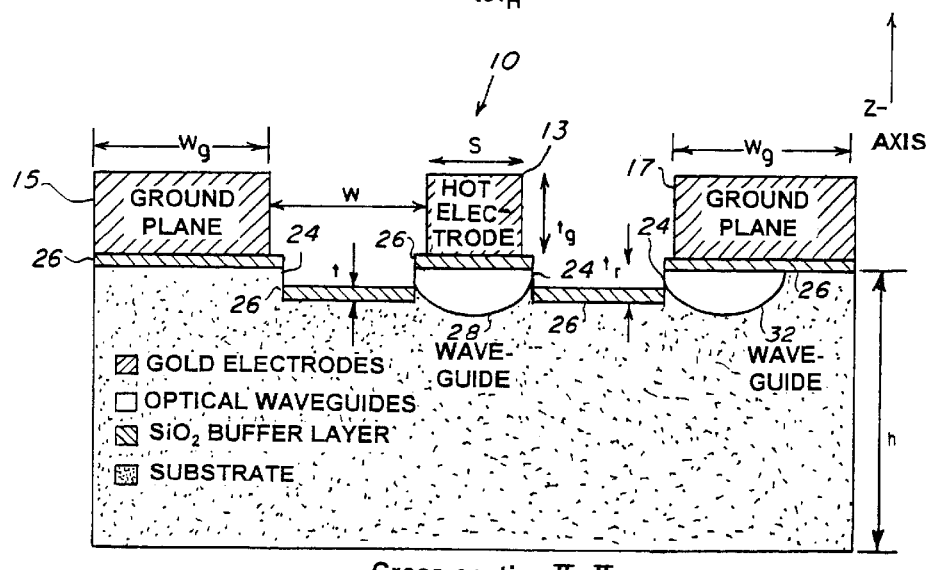
FIG. 1c shows a cross sectional view of the active region of a coplanar waveguide electrode structure and Mach-Zehnder interferometer with a low loss coplanar waveguide horn for low drive voltage LiNbO$_3$ modulators (Cross-section thru the section II—II of FIG. 1a).

The device 10, as shown in FIGS. 1a, 1b, and 1c is comprised of a center or hot electrode 12, to which a modulating signal 14 from a microwave source 16 is applied, and two ground planes 15 and 17 on opposite sides of the hot central electrode 13. The coplanar waveguide horn structure comprised of electrodes 12, 18, and 22 is flared out to a larger geometry at its ends, to form "horns", such region being designated by the subscript "H", for connection to a microwave connector either directly or with wire bonds. In some cases the coplanar electrodes, at the output end, 23, 25 and 27 are terminated directly, within the package, with a terminating resistor, so that only an input horn 16 is used. The electrodes 13, 15, and 17, which comprise the active region of the device, are disposed on a substrate 24, typically Z-cut lithium niobate (LiNbO$_3$) having a mean dielectric constant of approximately 35. The substrate may also be a X-cut lithium niobate, lithium tantalate or any other ferroelectric material. It is noted that FIG. 1c shows the Z-cut LiNbO$_3$ substrate 24 at the cross-section II—II, in the active region. The Z-axis is normal to the plane of the LiNbO$_3$ substrate 24.

The electrodes 13, 15 and 17 are typically made of gold, plated to a thickness of typically 10–30 μm, however copper or any other high conductivity material may be used. Larger electrode 13, 15, and 17 thicknesses are possible, the only limitation being the thickness that may be plated utilizing available equipment. The inter-electrode gap width, W, between the center electrode 13 and each of the grounded electrodes 15 and 17 is selected to be typically between 10 μm and 25 μm in the active region of the device. The grounded electrodes 15 and 17 typically have an electrode width, Wg, of a few mm or less, and the center electrode 13 a width, S, of 8 μm in the active region of the device Normally, the electrode length in the active section of the device 10 is ~4 cm in length. The low frequency drive voltage can be increased or decreased by changing the length of the device 10.

In this invention, the thickness of the substrate 24 is not critical; if it is too thin the substrate will likely suffer a structural failure, and if too thick will result in poor electrical transmission. The substrate 24 has electro-optic effects, and may be etched to form a ridge structure having a depth, $t_r$, of typically ~4 μm between the electrodes 13, 15, and 17, and coated with an exemplary silicon dioxide (SiO$_2$) buffer layer 26 having a typical thickness, t, of 0.6–0.9 μm. The purpose of the etched ridge is to simultaneously achieve a velocity match between the electrical and optical modes while maintaining an electrical line impedance near 50Ω. However, the aims of this invention may be achieved with or without the etched ridge.

In addition, the substrate 24 contains two optical waveguides 28 and 32 under electrodes 13 and 17, respectively. An optical modulator having a ridge structure is shown in Noguchi et al, A BROADBAND Ti:LiNbO$_3$ OPTICAL MODULATOR WITH RIDGE STRUCTURE, J. Lightwave Tech., Vol. 13, No. 6, pp. 1164–1168, June 1995, and Burns et al., PROSPECTS FOR LOW DRIVE VOLTAGE LiNbO$_3$ BROADBAND MODULATORS, IEEE AP-S Symposium, Montreal, Que., Canada, 1997. The optical waveguides 28 and 32 are optically connected together at one end 42 and at a second end 44 to form a Mach-Zehnder interferometer configuration. Ti:LiNbO$_3$ optical waveguides 28 and 32 are formed by depositing a strip of titanium, Ti, metal on the surface of the LiNbO$_3$ substrate 24 and diffusing it into the surface of the LiNbO$_3$ substrate 24 at high temperature by techniques well known to those skilled in the art. The optical phase velocity of the Mach-Zehnder interferometer structure is fixed by the index of refraction of LiNbO$_3$ which is approximately 2.2. The forming of the optical waveguides 28 and 32 is done before the SiO$_2$ buffer layer 26 and the electrodes 13, 15, and 17 are deposited but after the substrate 24 has been etched to a depth, $t_r$. The thickness, h, of the substrate 24 is not critical in the teachings of this invention, typically it is ~≦1 mm. An X-cut LiNbO$_3$ substrate may be used with an appropriate electrode structure that employs horizontal fields.

Portions of electrodes 13, 15, and 17 extend in parallel paths over an electrode interaction length L (to be explained below) which is parallel to the legs 28 and 32 of the Mach-Zehnder interferometer forming the optical waveguide structure. The SiO$_2$ buffer layer 26 isolates the optical waveguides 28 and 32 from the metal electrodes 13, 15, and 17 of the coplanar waveguide structure to prevent optical loss. The horn structures 12, 18 and 22 are ≦3 mm long and the active waveguides 28 and 32 are ~4–5 cm long. As shown in FIG. 1a, the electrode horn 12 receives the signal 33 for transmission to the center electrode 13 and is terminated by the termination resistor 25. At the input and output horn region of the CPW waveguide, shown in FIG. 1b, the widths flare out to reach dimensions of hundreds of microns and even to the millimeter range to enable the connection of microwave connectors (not shown).

In operation, an optical light 34 from an optical light source 36, such as a laser, typically a CW laser, is focused by a lens 38 onto the optical waveguide 42, and subsequently the optical waveguides 28 and 32 forming the legs of the Mach-Zehnder interferometer and propagates through the legs 28 and 32. At the same time, a digital or analog modulated microwave drive signal 33 at a typical amplitude of 4 to 5 volts peak and a frequency, in a typical range of 0 Hz to 40 GHz, is applied from a microwave source 16 to the coplanar waveguide structure (between the center electrode 13 and each of the grounded electrodes 15 and 17 on the same side of the optical modulator as the optical light 34 is transmitted in the optical waveguides 28 and 32. The drive voltage signal 33 modulates the phase of the propagating optical light 34, or optical wave, at the frequency of the microwave drive signal 33. More particularly, the optical phase modulation results from an interaction between the optical wave 34 in the optical waveguide structure, and the microwave drive signal 33 in the coplanar waveguide structure.

The microwave effective index of the CPW mode for a given geometry of the electrode and etched ridge structure is determined by the thickness of the electrodes 13, 15, and 17. Therefore, the thickness of the electrodes 13, 15, and 17 must be adjusted so that the waveguide microwave effective index is equal to the optical effective index in the optical waveguide (which is approximately 2.2 for $LiNbO_3$) to achieve phase velocity matching.

The structure forming the device 10 is made by photolithography using a series of photo lithographic mask patterns.

Other types of traveling wave modulators, such as reflection interferometers, directional couplers, active branches, etc. may be used in place of a Mach-Zehnder interferometer.

Other types of coplanar electrodes, such as coplanar strip electrodes, may be used in place of the coplanar waveguide electrodes.

Figure 2:
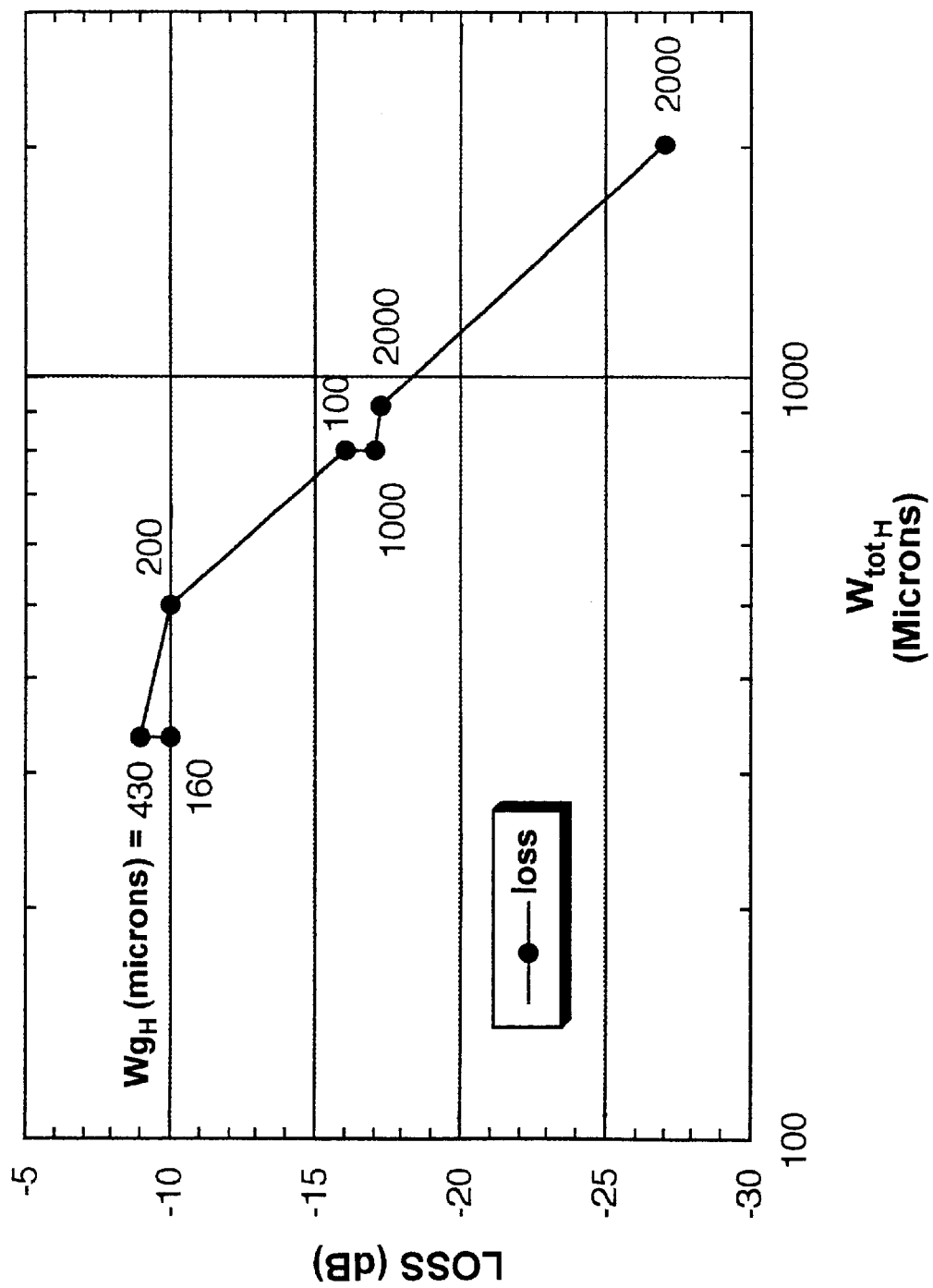
FIG. 2 shows measured total electrical loss at 40 GHz for CPW transmission lines with input and output horns, as a function of the maximum total waveguide width, $W_{tot_H}$, of the input and output coupling horns. Also shown are the values of ground plane width, $W_{g_H}$, for each case.

FIG. 2 shows the total electrical loss at 40 GHz for CPW transmission lines with input and output horns, as a function of the maximum total waveguide width, $Wtot_H$, of the input and output coupling horns. The loss values shown are average values showing loss due to coupling to radiation modes, not accounting for loss dips due to coupling to substrate modes when such coupling occurs. Shown are the values of ground plane width, $W_{g_H}$, for each case. For values of $W_{tot_H} > 500$ $\mu$m, leaky mode loss proportional to $W^2_{tot_H}$ dominates. For $W_{tot_H} \leq 500$ $\mu$m, leaky mode loss is negligible and loss is dominated by Ohmic loss in the length of the line.

Figure 3A:
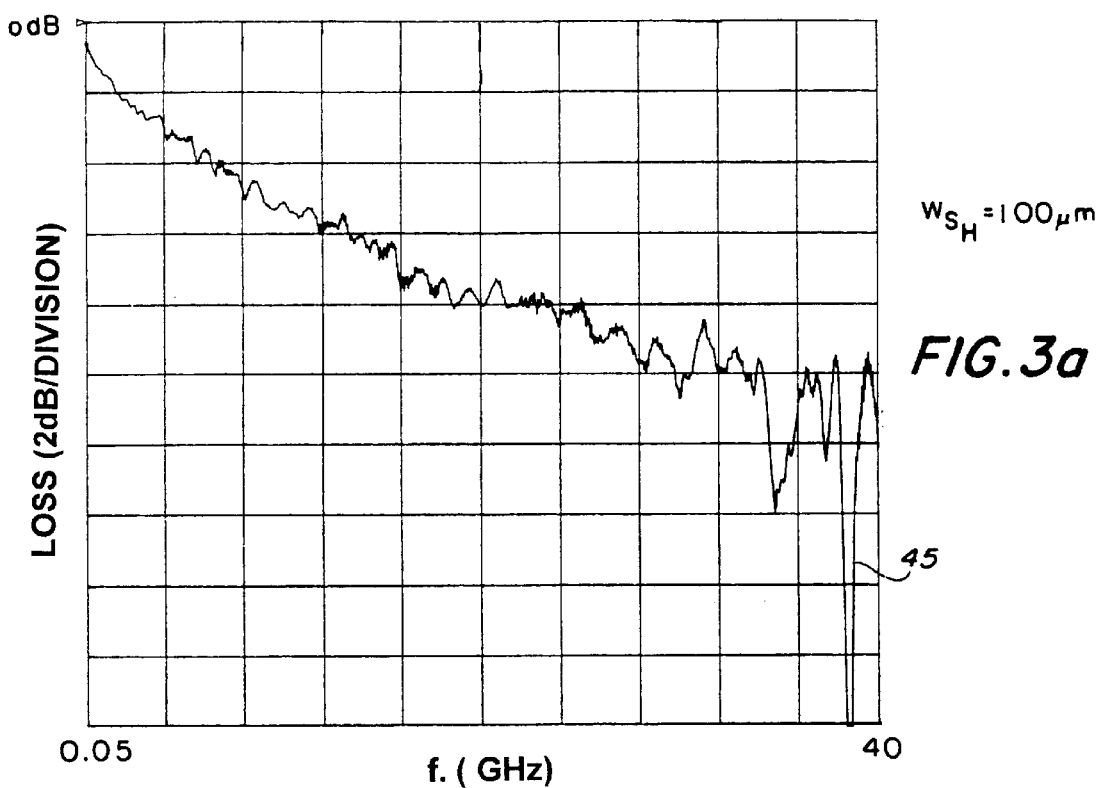
FIG. 3a shows the effect of the ground plane width on coupling of the guided mode to substrate modes setting forth the measured transmission loss for a structure with $W_{tot_H}$ ~500 µm, but with $W_{g_H}$ of 2000 µm.
Figure 3B:
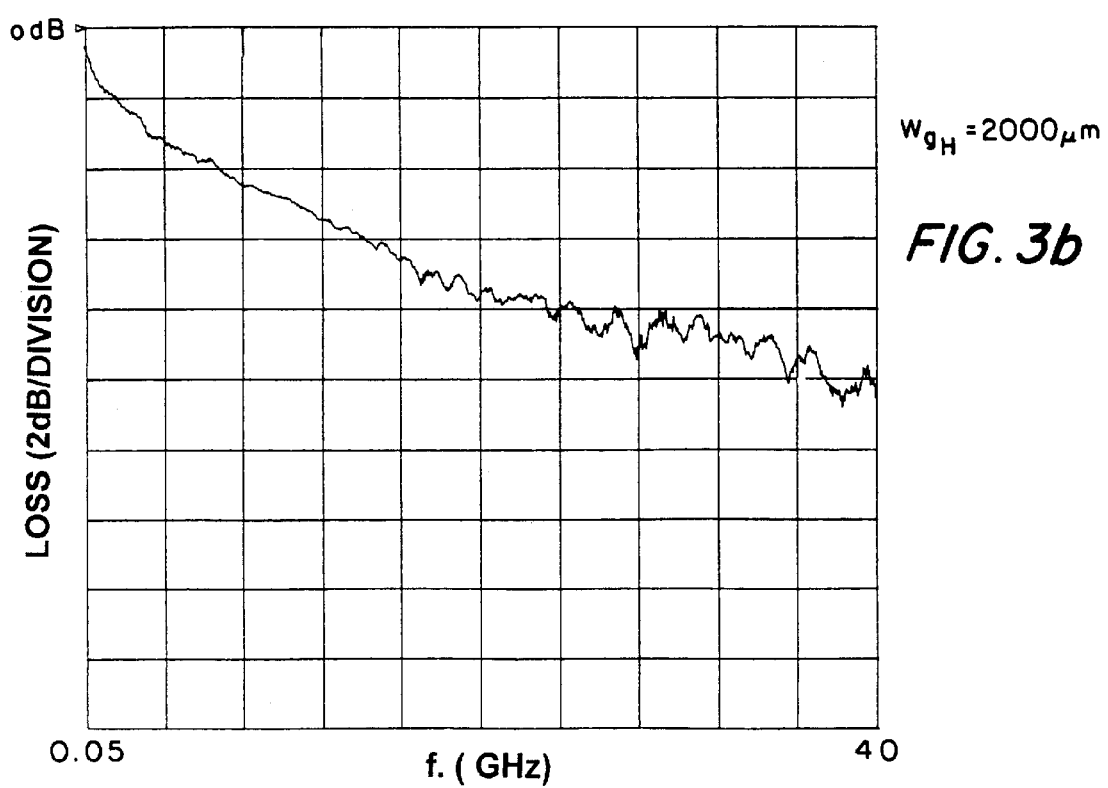
FIG. 3b shows the effect of the ground plane width on coupling of the guided mode to substrate modes by setting forth the measured transmission loss for a structure with $W_{tot_H}$ ~500 µm, but with $W_{g_H}$ of 200 µm.

In FIGS. 3a and 3b, the effect of the ground plane width on coupling of the guided mode to substrate modes is shown. The measured transmission loss for two structures with $W_{tot_H} \sim 500$ $\mu$m, but with $W_{g_H}$ of 2000 $\mu$m (FIG. 3a) and 200 $\mu$m (FIG. 3b) is set forth. The large dips 45 appearing in FIG. 3a are the result of coupling from the guided mode to the substrate modes. As the width of the ground plane, $W_{g_H}$, was reduced from 2000 $\mu$m to 200 $\mu$m, a factor of 10, these large dips 45 were removed near 40 GHz in FIG. 3b.

Figure 4A:
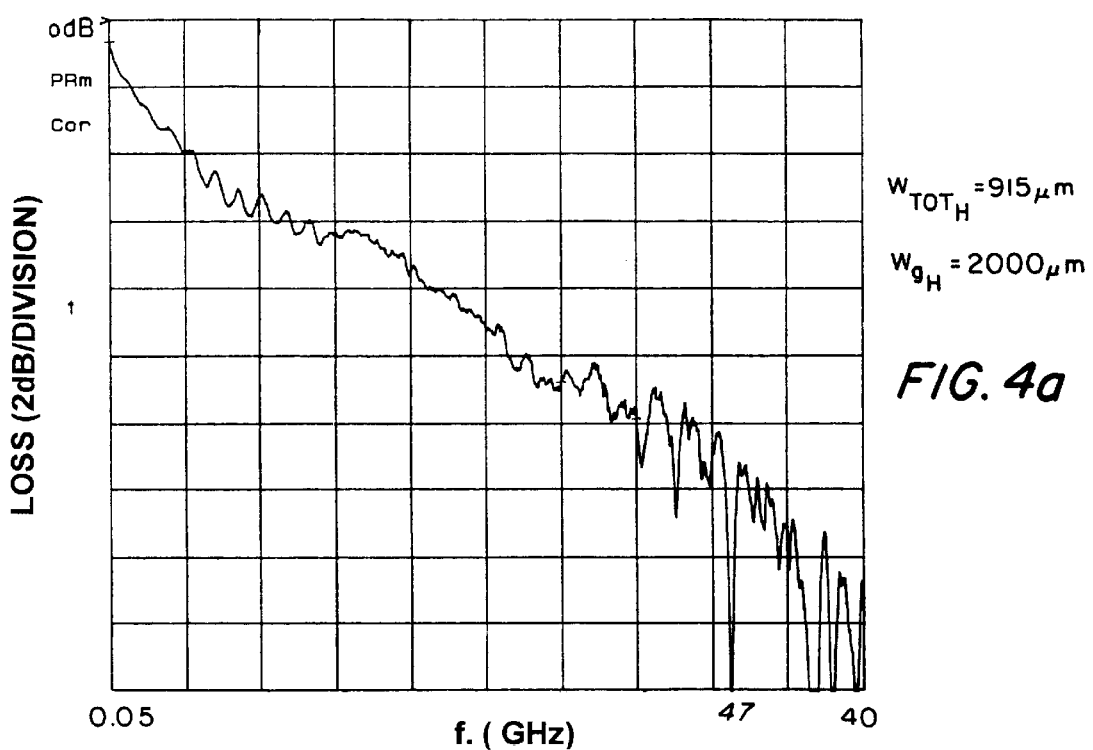
FIG. 4a shows measured transmission loss for a structure with $W_{tot_H}$ of 915 µm and with a $W_{g_H}$ of 2000 µm.
Figure 4B:
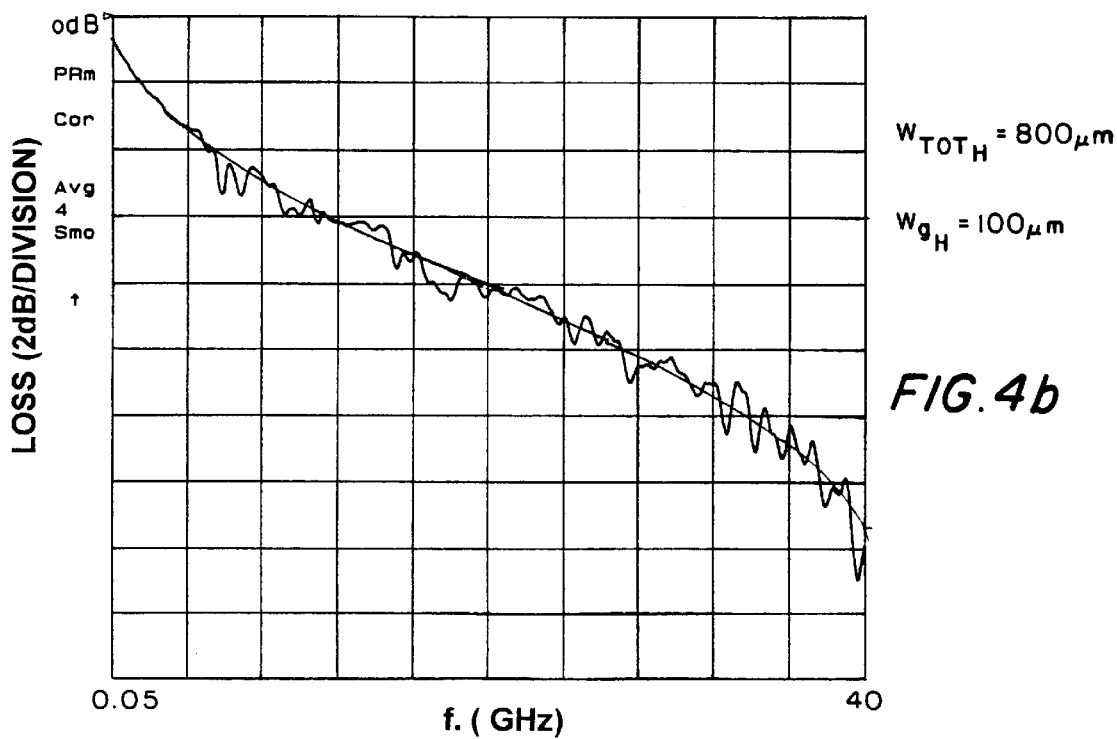
FIG. 4b shows measured transmission loss for a structure with $W_{tot_H}$ of 800 μm and with a $W_{g_H}$ of 100 μm.

FIGS. 4a and 4b shows measured transmission loss for two structures with similar values of $W_{tot_H}$ (915 and 800 $\mu$m) but with $W_{g_H}$ of 2000 $\mu$m (FIG. 4a) and 100 $\mu$m (FIG. 4b). The structure with the wide ground plane (FIG. 4a) shows loss dips 47 from coupling to substrate modes above ~30–35 GHz. Reducing the width of the ground plane, $W_{g_H}$, similar to that in FIG. 3b, from 2000 $\mu$m to 100 $\mu$m, causes these loss dips to disappear in FIG. 4b, showing no leaky mode loss to substrate modes. The structure of FIG. 3b shows no leaky mode loss at all. The structure of FIG. 4b shows some residual leaky mode loss to radiation modes with the characteristic $f^3$ frequency dependence, which is a consequence of $W_{tot_H} > 500$ $\mu$m in this structure.

All devices from which the data is shown in FIGS. 3a and 3b, and FIGS. 4a and 4b were fabricated on 0.5 mm thick substrates. Data similar to the result of FIG. 3b for the 200 $\mu$m ground plane width was also obtained from a device with a substrate 24 thickness of 1 mm. For the same horn geometry there was no leaky mode loss. This demonstrates that the approach disclosed here to avoid leaky mode loss can be used for substrate thicknesses up to at least 1 mm.

The device with $W_{g_H} = 100$ $\mu$m in FIG. 4b was fabricated on an etched ridge, Z-cut, $LiNbO_3$ modulator operating at 1.3 $\mu$m. Except for the novel horn structure disclosed here, this device was similar to one described in Noguchi et al, A BROADBAND Ti:$LiNbO_3$ OPTICAL MODULATOR WITH RIDGE STRUCTURE, J. Lightwave Tech., Vol. 13, No. 6, pp. 1164–1168, June 1995, with this device disclosed here using values for the electrode length of 4.1 cm, and for the value of W/S/W in the active region of 25/8/25 microns. The etched ridge height was 3.8 $\mu$m, silicon dioxide ($SiO_2$) thickness was 0.9 $\mu$m, and the electrode thickness was 21 $\mu$m.

Figure 5:
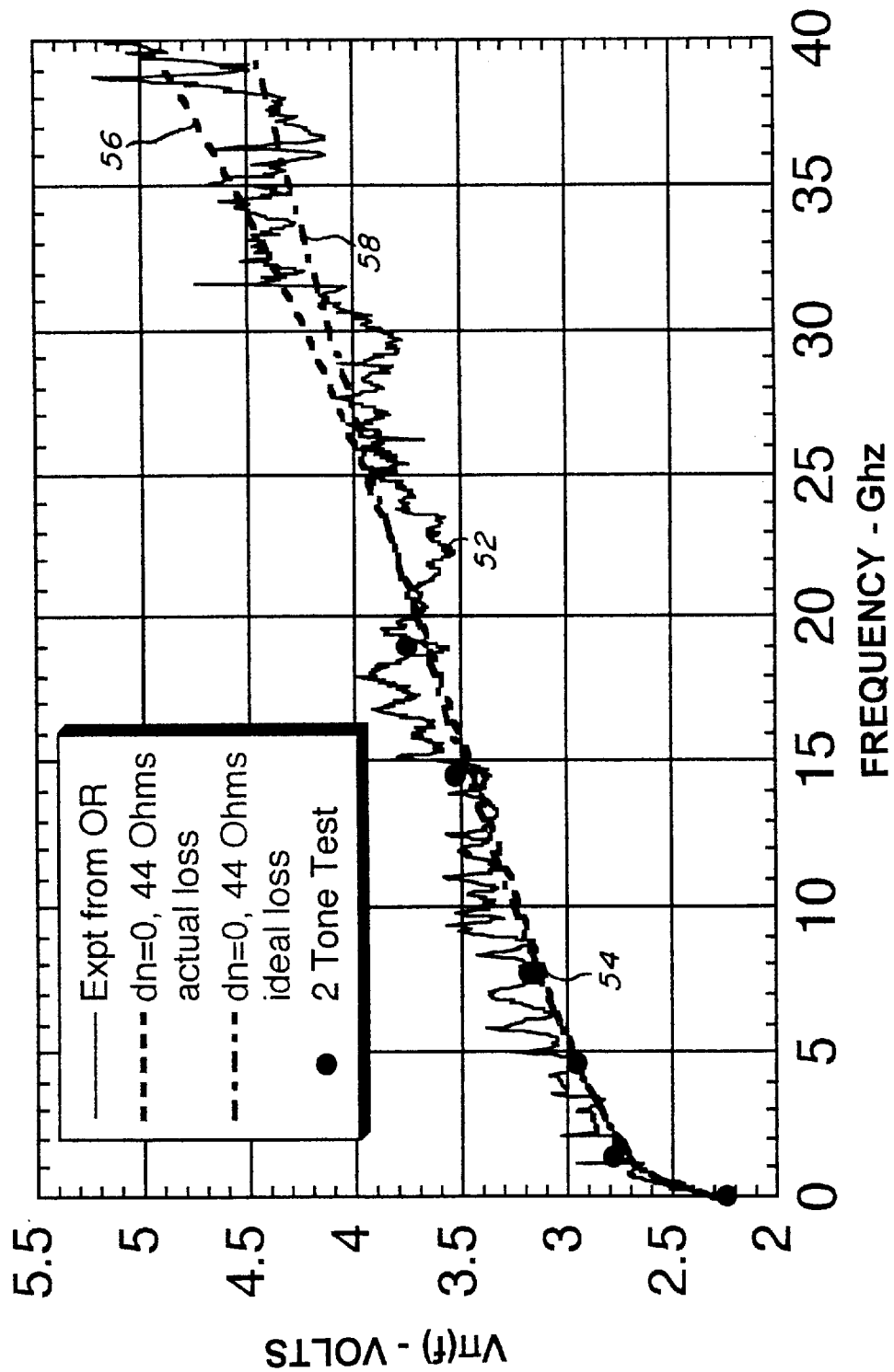
FIG. 5 shows the measured drive voltage (Vπ) for a device having an electrode length of 4.1 cm, having values of W/S/W in the active region of 25/8/25 microns, an etched ridge height of 3.8 μm, a silicon dioxide (SiO$_2$) thickness of 0.9 μm, an electrode thickness of 21 μm, and a substrate thickness of 0.5 mm.

Measured drive voltage ($V\pi$) for this device is shown in FIG. 5. The solid line 52 is derived from the measured optical response, the black circles 54 are experimental results obtained from two-tone measurements, and the dashed line 56 and dot-dashed line 58 show modeled results. The dashed line 56 model uses the actual loss measured from FIG. 4b, and the dot-dashed line 58 model shows the expected result if the $f^3$ contribution to the leaky mode loss were totally removed. Other assumptions in the model were perfect velocity match, and 44 Ohm impedance in the line. The drive voltage at 40 GHz was 5 V, lower than any result reported to date. This device was fully packaged with Wiltron K microwave connectors contacted directly to the end of the horns.

The techniques described in the preferred embodiment may be used for other material systems, such as semiconductors, polymers, or other types of ferroelectrics, for other types of traveling wave modulators, such as reflection interferometers, directional couplers, and active branches, and for a coplanar strip electrode structure as well as the coplanar waveguide electrode structures as taught above. SEE, Burns et al., BROAD-BAND REFLECTION TRAVELING-WAVE $LiNbO_3$ MODULATOR, Photon. Tech. Lett., Vol. 10, No. 6, pp. 805–806, June 1998. This invention controls leaky mode loss without having to thin the substrate, so as to be able to work with more conventional 0.5 or 1 mm thicknesses in a modulator at 40 GHz with the lowest drive voltage. By using a reduced total width horn geometry ($W_{tot_H} \sim \leq 500$ $\mu$m) in combination with a reduced width ground plane ($W_{g_H} \sim <3-5$ times the gap width $W_H$) in the widest part of the horn, the leaky mode loss can be eliminated while maintaining the capability to use conventional 0.5 or 1.0 mm thick substrates, a large enough horn size that connection can be made to a microwave connector either directly or with wire bonds, and operation over at least 40 GHz.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. An electro-optic modulator comprising:
   a substrate having electro-optic effects;
   said substrate having a plurality of optical waveguides under a plurality of preselected ridge structures receiving and transmitting therethrough in a selected direction and with a first phase velocity;
   a buffer layer disposed on the plurality of ridge structures;
   a coplanar waveguide electrode structure disposed on a preselected plurality of ridge structures and receiving an electrical signal propagating in a first direction with a second phase velocity to modulate the light in the plurality of optical waveguides as a function and frequency of the electrical signal, said first and second phase velocities being approximately equal; and said coplanar waveguide structure further comprises a center electrode and two grounded electrodes which a reduced maximum total electrode horn width in combination with a maximum value of a reduced ground electrode width in the horn, so as to eliminate leaky mode loss.

2. The electro-optic modulator, as in claim 1, wherein said substrate has a plurality of etched ridge structures of a predetermined depth and separation between ridges.

3. The electro-optic modulator, as in claim 1, wherein said coplanar waveguide structure comprises a center electrode and two grounded electrodes.

4. The electro-optic modulator, as in claim 3, wherein said coplanar waveguide structure comprises a center electrode and two grounded electrodes which have a reduced maximum total electrode horn width geometry of approximately $\leq 750$ $\mu$m in combination with a maximum value of a reduced grounded electrode width of approximately $\leq 5$ times a gap width, $W_H$, in the horn, so as to eliminate leaky mode loss.

5. The electro-optic modulator, as in claim 1, wherein said coplanar waveguide structure further comprises a center electrode and at least one grounded electrode.

6. The electro-optic modulator, as in claim 1, wherein said substrate is lithium niobate.

7. The electro-optic modulator, as in claim 3, wherein each of said center and grounded electrodes are comprised of gold.

8. The electro-optic modulator, as in claim 3, wherein each of said center and grounded electrodes are comprised of copper.

9. The electro-optic modulator, as in claim 3, wherein each of said center and grounded electrodes are comprised of any high conductivity material.

10. The electro-optic modulator, as in claim 3, wherein said center electrode is separated from each grounded waveguide by a predetermined distance.

11. The electro-optic modulator, as in claim 1, wherein said substrate is comprised of Z-cut lithium niobate.

12. The electro-optic modulator, as in claim 1, wherein said substrate is comprised of Z-cut lithium tantalate.

13. The electro-optic modulator, as in claim 1, wherein said substrate is comprised of X-cut lithium niobate with the waveguides placed between the electrodes, rather than under them, and without the ridges.

14. The electro-optic modulator, as in claim 1, wherein said substrate is comprised of any Z-cut ferroelectric material.

15. The electro-optic modulator, as in claim 1, wherein the thickness of the substrate is $\leq 1.5$ mm.

16. The electro-optic modulator, as in claim 1, wherein said plurality of optical waveguides is a Mach-Zehnder interferometer comprising a first and second optical waveguide.

17. The electro-optic modulator, as in claim 16, wherein;

said first optical waveguide is disposed underneath said center electrode; and said second optical waveguide is disposed underneath one of the grounded electrodes.

18. The electro-optic modulator, as in claim 1, wherein said buffer layer is silicon dioxide.

19. The electro-optic modulator, as in claim 18, wherein said buffer layer of silicon dioxide has a thickness of approximately 0.3–1.5 $\mu$m.

20. The electro-optic modulator, as in claim 1, wherein said buffer layer is a ceramic.

21. The electro-optic modulator, as in claim 1, wherein said buffer layer is a polymer.

22. The electro-optic modulator, as in claim 1, wherein said buffer layer is a multilayer combination of silicon dioxide and a ceramic.

23. An electro-optic modulator comprising:

a substrate having an electro-optic effects;

said substrate having a plurality of optical waveguides structures receiving and transmitting therethrough in a selected direction and with a first phase velocity;

a buffer layer disposed on the substrate;

a coplanar waveguide electrode structure disposed on the substrate receiving an electrical signal propagating in said selected direction with a second phase velocity to modulate the light in the plurality of optical waveguides as a function and frequency of the electrical signal; and said coplanar waveguide structure comprises a center electrode and one or more grounded electrodes which have a reduced maximum total electrode horn width geometry of approximately $\leq 750$ $\mu$m in combination with a maximum value of a reduced grounded electrode width of approximately $\leq 5$ times a gap width, $W_H$, in the horn so as to eliminate leaky mode loss.

* * * * *